(12) United States Patent
Kramer et al.

(10) Patent No.: US 12,288,144 B2
(45) Date of Patent: Apr. 29, 2025

(54) MACHINE LEARNING SYSTEM TO PREDICT CAUSAL TREATMENT EFFECTS OF ACTIONS PERFORMED ON WEBSITES OR APPLICATIONS

(71) Applicant: AMPLITUDE, INC., San Francisco, CA (US)

(72) Inventors: Scott Kramer, New York City, NY (US); Cynthia Rogers, Palo Alto, CA (US); Eric Pollmann, Los Altos, CA (US); Muhammad Bilal Mahmood, San Francisco, CA (US)

(73) Assignee: AMPLITUDE, INC., San Francisco, CA (US)

( * ) Notice: Subject to any disclaimer, the term of this patent is extended or adjusted under 35 U.S.C. 154(b) by 0 days.

(21) Appl. No.: 18/633,929

(22) Filed: Apr. 12, 2024

(65) Prior Publication Data

US 2024/0370772 A1   Nov. 7, 2024

Related U.S. Application Data

(63) Continuation of application No. 17/967,617, filed on Oct. 17, 2022, now Pat. No. 11,960,980, which is a
(Continued)

(51) Int. Cl.
*G06N 20/00* (2019.01)
*G06F 9/451* (2018.01)
(Continued)

(52) U.S. Cl.
CPC ............. *G06N 20/00* (2019.01); *G06F 9/451* (2018.02); *G06F 11/3438* (2013.01);
(Continued)

(58) Field of Classification Search
CPC ..... G06N 20/00; G06F 9/451; G06F 11/3438; G06F 11/3466; G06F 17/16; G06F 17/18; G06Q 30/02
(Continued)

(56) References Cited

U.S. PATENT DOCUMENTS 7,809,601 B2   10/2010   Shaya et al.
8,775,338 B2   7/2014   Lee
(Continued)

FOREIGN PATENT DOCUMENTS

WO   WO-2021050740 A1   3/2021

OTHER PUBLICATIONS

Zhang, Shuai et al. "Deep Learning based Recommender System: A Survey and New Perspectives," ACM Comput. Surv. 1, 1, Article 1, Jul. 2018 (35 pages).
(Continued)

*Primary Examiner* — William D Titcomb
(74) *Attorney, Agent, or Firm* — Goodwin Procter LLP

(57) ABSTRACT

Systems and methods for computing a causal uplift in performance of an output action for one or more treatment actions in parallel are described herein. In an embodiment, a server computer receives interaction data for a particular period of time which identifies a plurality of users and a plurality of actions that were performed by each user of the plurality of users through a particular graphical user interface during the particular period of time. The server computer uses the interaction data to generate a feature matrix of actions for each user, and a set of confounding variables included to minimize spurious correlations. The feature matrix is then used to train a machine learning system, using data identifying a user's performance or non-performance of each action as inputs and data identifying performance or non-performance of a target output action as the output. A
(Continued)

treatment effect is then computed for a treatment action by generating a simulated treatment matrix where all values for the treatment action are set to true, computing an average of outputs from the machine learning system using the simulated treatment matrix, generating a simulated control matrix where all values for the treatment action are set to false, computing an average of outputs from the machine learning system using the simulated control matrix, and computing a difference between the two average outputs.

20 Claims, 6 Drawing Sheets

Related U.S. Application Data continuation of application No. 16/525,457, filed on Jul. 29, 2019, now Pat. No. 11,475,357.

(51) Int. Cl.
```
G06F 11/34      (2006.01)
G06F 17/16      (2006.01)
G06F 17/18      (2006.01)
G06Q 30/02      (2023.01)
H04L 67/50      (2022.01)
```
(52) U.S. Cl.
CPC .......... *G06F 11/3466* (2013.01); *G06F 17/16* (2013.01); *G06F 17/18* (2013.01); *G06Q 30/02* (2013.01); *H04L 67/535* (2022.05)

(58) Field of Classification Search
USPC .......................................................... 706/12
See application file for complete search history.

(56) References Cited

U.S. PATENT DOCUMENTS

| | | | |
|---|---|---|---|
| 8,779,266 B2 | 7/2014 | Basso et al. | |
| 8,782,162 B1 | 7/2014 | Deshpande et al. | |
| 8,812,960 B1 | 8/2014 | Sun et al. | |
| 10,699,203 B1 | 6/2020 | Ozcaglar et al. | |
| 11,115,421 B2* | 9/2021 | Nevatia ................. | G06F 21/554 |
| 11,475,357 B2* | 10/2022 | Kramer .................. | G06N 20/00 |
| 11,960,980 B2* | 4/2024 | Kramer .................. | G06F 17/18 |
| 2003/0182281 A1 | 9/2003 | Wittkowski | |
| 2005/0256844 A1 | 11/2005 | Cristol | |
| 2005/0278731 A1 | 12/2005 | Cameron et al. | |
| 2006/0089812 A1 | 4/2006 | Jacquez | |
| 2006/0122807 A1 | 6/2006 | Wittkowski | |
| 2007/0156809 A1 | 7/2007 | Dickinson et al. | |
| 2007/0192170 A1 | 8/2007 | Cristol | |
| 2007/0208545 A1 | 9/2007 | Wittkowski | |
| 2008/0183454 A1 | 7/2008 | Barabasi et al. | |
| 2008/0234976 A1 | 9/2008 | Wittkowski | |
| 2009/0254399 A1 | 10/2009 | Cristol | |
| 2010/0161709 A1 | 6/2010 | Fourman | |
| 2010/0179930 A1 | 7/2010 | Teller et al. | |
| 2010/0274661 A1 | 10/2010 | Aaltonen et al. | |
| 2010/0312884 A1 | 12/2010 | Nandy et al. | |
| 2011/0137950 A1 | 6/2011 | Deng et al. | |
| 2011/0179020 A1 | 7/2011 | Ozzie et al. | |
| 2011/0225142 A1 | 9/2011 | McDonald | |
| 2014/0337474 A1 | 11/2014 | Khuti et al. | |
| 2014/0358825 A1 | 12/2014 | Phillipps et al. | |
| 2014/0379811 A1 | 12/2014 | Chan et al. | |
| 2015/0332308 A1 | 11/2015 | Liu | |
| 2016/0027037 A1 | 1/2016 | Cai et al. | |
| 2016/0155143 A1 | 6/2016 | Hsiao et al. | |
| 2016/0173540 A1 | 6/2016 | Linden et al. | |
| 2016/0173617 A1 | 6/2016 | Allinson | |
| 2016/0189202 A1 | 6/2016 | Wang et al. | |
| 2016/0321308 A1 | 11/2016 | Brinnand | |
| 2017/0076299 A1 | 3/2017 | Modarresi | |
| 2017/0116525 A1 | 4/2017 | Pinel et al. | |
| 2017/0206552 A1 | 7/2017 | Rajkumar et al. | |
| 2017/0223036 A1 | 8/2017 | Muddu et al. | |
| 2017/0235848 A1 | 8/2017 | Van Dusen et al. | |
| 2018/0210808 A1 | 7/2018 | Shanmugam et al. | |
| 2018/0225709 A1 | 8/2018 | Ferber et al. | |
| 2019/0163829 A1 | 5/2019 | Puri et al. | |
| 2019/0244348 A1 | 8/2019 | Buckler et al. | |
| 2020/0251213 A1 | 8/2020 | Tran et al. | |
| 2020/0412726 A1* | 12/2020 | Nevatia ................. | H04L 63/102 |
| 2021/0035010 A1 | 2/2021 | Kramer et al. | |

OTHER PUBLICATIONS

International Search Report and Written Opinion for International Patent Application No. PCT/US2020/041996, dated Sep. 29, 2020 (7 pages).

Aerendir, "How to Track Unique Users with Behavioural Analytics Tools," available at https://io.serendipityhq.com/experience/behavioural-analytics-tracking-unique-users/, Nov. 17, 2018.

International Search Report and Written Opinion for International Patent Application No. PCT/US2020/066456, dated Mar. 18, 2021 (16 pages).

International Search Report and Written Opinion for International Patent Application No. PCT/US2022/021993, dated Mar. 25, 2022 (10 pages).

International Search Report and Written Opinion for International Patent Application No. PCT/US2022/022858, dated Sep. 13, 2022 (15 pages).

Jayaram, "Mixpanel System Architecture," available at https://mixpanel.com/wp-content/uploads/2018/06/System-architecture_June2018.pdf, Jun. 2018.

Wong, "Nova: The Architecture for Understanding User Behavior," available at https://amplitude.com/blog/nova-architecture-understanding-user-behavior, May 25, 2016.

Wong, "Scaling Analytics at Amplitude," available at https://amplitude.com/blog/scaling-analytics-at-amplitude, Aug. 25, 2015.

Carasso, "Exploring Splunk—Search Processing Language (SPL) Primer and Cookbook," 2012.

U.S. Appl. No. 18/482,774, filed Oct. 6, 2023, Real Time System for Ingestion, Aggregation, and Identity Association of Data From User Actions Performed on Websites or Applications.

U.S. Appl. No. 17/214,379, filed Mar. 26, 2021, Computationally Efficient System and Method for Observational Casual Inferencing.

U.S. Appl. No. 17/710,586, filed Mar. 31, 2022, Delivery of Data-Driven & Cross-Platform Experiences Based on Behavioral Cohorts & Identity Resolution.

* cited by examiner

MACHINE LEARNING SYSTEM TO PREDICT CAUSAL TREATMENT EFFECTS OF ACTIONS PERFORMED ON WEBSITES OR APPLICATIONS

CROSS-REFERENCE TO RELATED APPLICATIONS

This application is a continuation of U.S. application Ser. No. 17/967,617, filed Oct. 17, 2022 and entitled "MACHINE LEARNING SYSTEM TO PREDICT CAUSAL TREATMENT EFFECTS OF ACTIONS PERFORMED ON WEBSITES OR APPLICATIONS," which is a continuation of U.S. application Ser. No. 16/525,457, filed Jul. 29, 2019 and entitled "MACHINE LEARNING SYSTEM TO PREDICT CAUSAL TREATMENT EFFECTS OF ACTIONS PERFORMED ON WEBSITES OR APPLICATIONS," each of which is hereby incorporated by reference in its entirety.

FIELD OF THE DISCLOSURE

One technical field of the present disclosure is computer-implemented calculation of causal inference estimations in relation to actions performed on websites or applications. Another technical field is classification or machine learning systems, such as regression models, applied to the problem of determining the causal vs correlated effect of user actions on a user account's or client computer's future behavior.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

In website and application design, marketers and developers often have a vision of an optimal usage of the website or application. The optimal usage often centers around performance of a particular action on the website or application. These actions can include completing registration, performing a purchase, upgrading an account, logging in a certain number of times during a week, or using other features of the website or application.

It can be difficult to design a website or application, or related marketing activities, in a manner that increases the likelihood of users performing specific tasks. Ideally, a website or application developer would be able to find the actions on a website or application that increase the likelihood of performance of a target action. The website or application developer can then rearrange the website or application to prominently feature the actions which cause the highest conversion rate, that is, those that most greatly increase the likelihood of performance of the target action. A marketer can in complement engage their customers through email and ad networks to drive increased utilization of those same causal actions that maximize likelihood of a subsequent target action, As companies become more sophisticated with website and application design, the number of actions a person can perform on a website or application greatly increases. With thousands of actions that can be performed, isolating the actions that increase the likelihood of performance of a target action can be increasingly difficult. Analyzing historical data by observing which actions occur prior to the target action is insufficient, as those actions may simply be correlated and not causal to the target action. This problem, referred to as causal inference, can be solved with some difficulty with a small number of variables to analyze, but can be almost impossible to solve given the increasing freedom of action in websites and applications.

This problem of causal inference is often solved through experimentation. For example, a developer could perform a controlled experiment or A/B test where one group of users is provided with a website or application with functionality for performing a treatment action while another group of users is provided with a website or application without the functionality. The results from the two groups are then compared to identify the difference in performance of a target action between the groups, indicating the causal treatment effect.

Controlled experiments is the gold standard for understanding causal treatment effects, but are not scalable to the sizes of most websites or applications. Controlled A/B Tests and experiments can take months to run, and with thousands of potential user actions on a website application, the number of experiments needed to prove the causal effect of every potential treatment variable or action could take years to complete.

As a result, data scientists will sometimes employ an observational study on a website or application's historical data. Observational studies simulate A/B tests on historical data, identify confounding variables which may introduce correlation bias, and project the potential causal effect of treatment actions towards a target action. Such studies however often have to be manually constructed by a data scientist and can also take an exceptionally long amount of time, especially when considering confounding features, such as differences in user demographics. The manual nature of the studies also reduces the adaptability of the studies to different actions as well as different websites or applications. Finally, human bias is nearly impossible to remove from observational studies, as specific actions have to be manually selected. These problems are compounded if a website or application contains multiple target actions.

Thus, there is a need for a system and method which can efficiently estimate causal treatment effects for websites or applications which can be scalable to a large number of possible actions and which is adaptable to different websites or applications without requiring the manual creation of multiple experiments or studies.

SUMMARY OF THE DISCLOSURE

The appended claims may serve as a summary of the disclosure.

DETAILED DESCRIPTION

Figure 1:
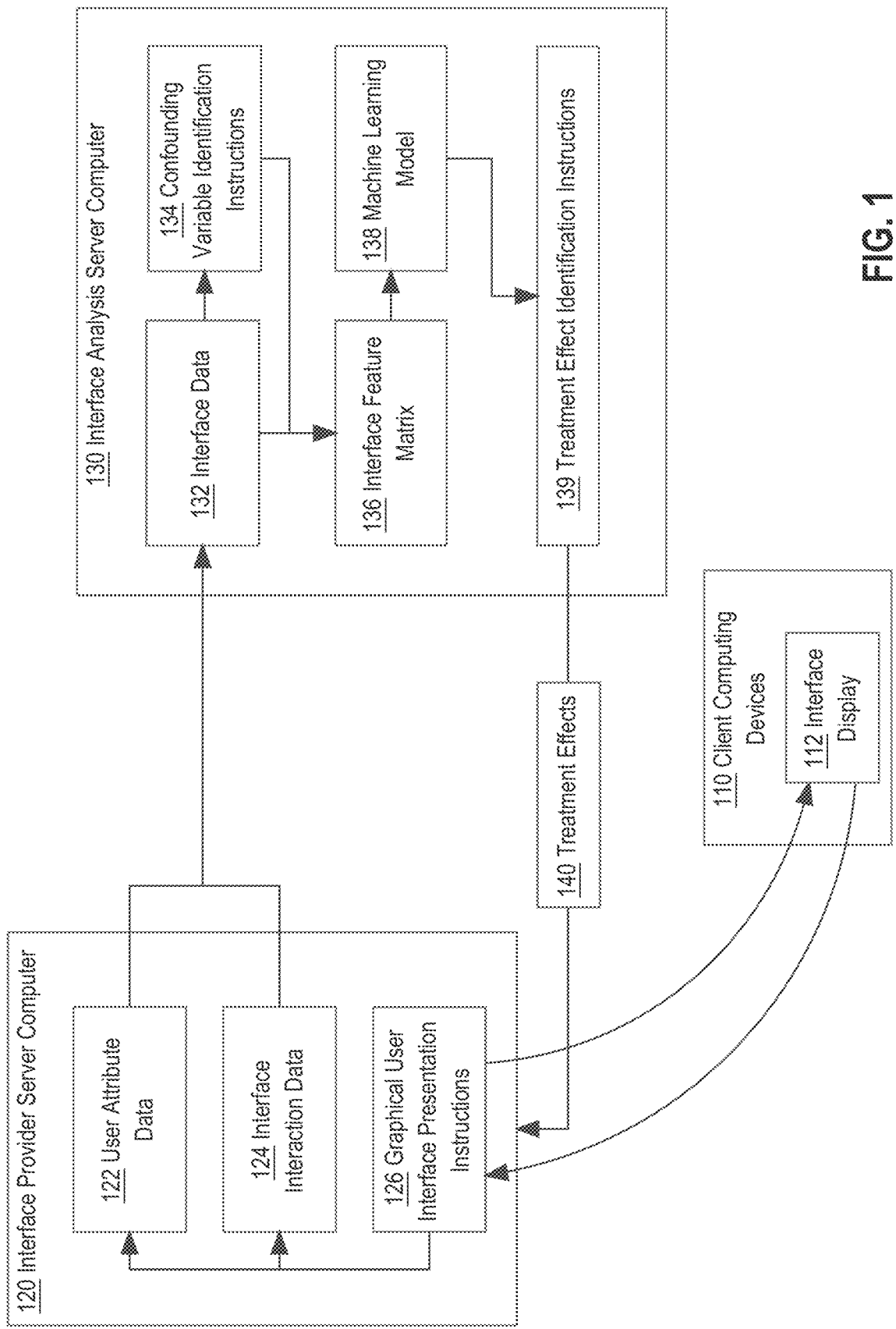
FIG. 1 is a block diagram of a system on which embodiments may be performed.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:
1. GENERAL OVERVIEW
2. SYSTEM OVERVIEW
3. FUNCTIONAL OVER VIEW
4. ESTIMATING TREATMENT EFFECTS
4.1. TREATMENT EXTRACTION
4.2. MATRIX SIMPLIFICATION
4.3. CONFOUNDING VARIABLE GENERATION
4.4 MACHINE LEARNING MODEL
4.5 COMPUTING TREATMENT EFFECTS
4.6 EXAMPLE TREATMENT EFFECT INTERFACE
4.7 PARALLELIZATION
5. BENEFITS OF CERTAIN EMBODIMENTS
6. HARDWARE OVERVIEW 1. General Overview Systems and methods for generating projections of causal treatment effects for a plurality of actions are described herein. In an embodiment, a server computer receives tracked interaction data from an interface provider. The tracked interaction data uniquely identifies a plurality of users and identifies actions performed through a particular interface by the plurality of users. The server computer additionally receives configuration data identifying one or more target actions. The server computer uses the interaction data to generate a feature matrix by creating rows for each uniquely identified user and columns for each action other than the target action. Thus, each matrix cell value would comprise a value indicating whether a particular user performed a particular action. The server computer also creates an output vector with each element corresponding to a row of the feature matrix and each value indicating whether the row's user performed the target action. The server computer then trains a machine learning system using the feature matrix as the input and the output vector as the output.

The machine learning system is thus trained to determine, based on data identifying performance or non-performance of each action on the interface, whether a user is likely to perform the target action. Yet this alone only indicates a correlation between the performance of a particular action and a target action. To compute a causal treatment effect for a particular action, the server computer must first identify additional confounding actions or variables that introduce correlation bias to each treatment action. Introducing these confounding variables will in turn control for behavioral differences between users and reduce the correlation effect in each treatment action and leave only the causal effect. The server computer then re-uses the feature matrix used for the machine learning system and appends the confounding actions as additional variables into the trained regression model. To compute the projected causal treatment effect, a simulation of an A/B Test is run wherein the differential of the regression model is run between a simulated control and treatment derived from the feature matrix. The simulated treatment is generated by identifying a column corresponding to the particular action, setting each value in the column to indicate performance of the particular action, and computes outputs for each row of the feature matrix in the generated regression model, and averages the results. The server computer computes the simulated control by setting each value in the column to indicate non-performance of the particular action, computes outputs for each row of the feature matrix using the machine learning system, and averages the results. The server computer then computes the projected causal treatment effect for the particular action as the difference between the two averaged results.

In an embodiment, a method comprises receiving, for a particular interface programmed in a computer which provides a plurality of options for performing a plurality of computer executable actions through the particular interface, interaction data for a particular period of time which identifies a plurality of users and a plurality of actions that were performed by each user of the plurality of users through the particular interface during the particular period of time; receiving configuration data identifying a particular action of the plurality of actions as an output variable; creating and storing in computer memory a feature matrix of actions comprising a plurality of rows corresponding to the plurality of users, a plurality of columns corresponding to the plurality of actions, and matrix cell values corresponding to the plurality of rows and plurality of columns comprising a count of a number of times a user performed an action or a binary indication as to whether the user performed the action; identifying confounding variables to eliminate spurious correlations via an intermediary machine learning technique; training a machine learning model using matrix cell values of the feature matrix of actions and confounding variables as inputs and a vector corresponding to performance or non-performance of the particular action as outputs; identifying a treatment action of the plurality of actions; for the treatment action, computing a treatment effect by: generating a simulated treatment feature matrix by setting all values for the treatment action to true; computing an average output for the true feature matrix using the trained machine learning model; generating a simulated control feature matrix by setting all values for the treatment action to false; computing an average output for the simulate control feature matrix using the trained machine learning mode; computing the treatment effect as a difference between the average output for the simulated treatment feature matrix and the average output for the simulated control feature matrix.

2. System Overview

FIG. 1 is a block diagram of a system on which embodiments may be performed.

Interface provider server computer 120 is communicatively coupled to client computing device 110 and interface analysis server computer 130 over one or more networks. Interface provider server computer 120 and interface analysis server computer 130 may be implemented using server-class computers or other computers having one or more processor cores, co-processors, or other computers. The server computers may be physical server computers and/or a virtual server instances stored in a data center, such as through cloud computing. While a single server computer is show for each of interface provider server computer 120 and interface analysis server computer 130, embodiments may comprise any number of computing devices. For example, interface provider server computer 120 may additionally comprise a client computing device used to communicate with the interface analysis server computer 130. As another example, interface analysis server computer 130 may comprise a plurality of server computers performing computations in parallel.

The network may be implemented by any medium or mechanism that provides for the exchange of data between the various elements of FIG. 1. Examples of the network include, without limitation, a cellular network, communicatively coupled with a data connection to the computing devices over a cellular antenna, one or more Local Area Networks (LANs), one or more Wide Area Networks (WANs), one or more Ethernets or the Internet, or one or more terrestrial, satellite or wireless links, or a combination thereof. The various elements of FIG. 1 may also have direct (wired or wireless) communications links, depending upon a particular implementation.

Interface provider server computer 120 provides a graphical user interface to client computing devices 110 through graphical user interface presentation instructions 126. The graphical user interface may comprise one or more web pages, one or more applications, and/or any interface which can be displayed on a client computing device and with which the client computing devices 110 can interface. The graphical user interface presentation instructions 126 comprise a set of instructions which, when executed, causes display of the graphical user interface on the client computing devices 110. The graphical user interface presentation instructions 126, when executed, may further cause the interface provider server computer 120 to respond to one or more actions performed by the client computing devices 110 through the graphical user interface. The response may include navigating to a different page of the graphical user interface, altering display of the current page of the graphical user interface, and/or storing data identifying the performed actions.

The client computing devices 110 may comprise computers that include hardware capable of communicatively coupling the computers to one or more server computers, such as interface provider server computer 120 over one or more service providers. For example, client computing device 110 may include a network card that communicates with interface provider server computer 120 through home or office wireless routers (not illustrated in FIG. 1) coupled to an internet service provider. Client computing devices 110 may be any of smart phones, personal computers, tablet computing devices, PDAs, laptops, or any other computing devices capable of transmitting and receiving information and performing the functions described herein. The client computing devices 110 may additionally comprise an interface display 112 comprising software configured to display the graphical user interface received from the interface provider server computer. For example, the client computing devices 110 may store browser software and/or downloaded applications used to display the graphical user interface.

Interface provider server computer 120 stores interface interaction data 124 and user attribute data 122. Interface interaction data comprises data which uniquely identifies each different user and identifies, for each different user, one or more actions performed through the graphical user interface. For example, the interface provider server computer 120 may store an interaction database which is updated with each user action performed through the graphical user interface. Additionally or alternatively, the interface provider server computer may receive interface interaction data 124 from a tracking entity, such as a customer data platform. User attribute data comprises data identifying one or more attributes for each user, such as age, location, gender, browsing history, or other provided user attribute data corresponding to the unique user identifiers.

Interface provider server computer 120 may provide user attribute data 122 and interface interaction data 124 to interface analysis server computer 130, which is then stored as interface data 132. For example, the interface provider server computer 120 may send the user attribute data 122 and interface interaction data 124 to the interface analysis server computer 130 through one or more application programming interfaces (APIs) provided by the interface analysis server computer 130. Additionally or alternatively, the interface provider server computer 120 may provide access to a stored interaction database to the interface analysis server computer 130. While FIG. 1 depicts the same device storing the interaction data and the graphical user interface presentation instructions 126, in an embodiment the tracking and storage of interaction data is performed by a separate device and/or entity than the providing of the graphical user interface. For example, a third-party customer data platform may track user actions through the graphical user interface and send the tracking data to interface analysis server computer 130.

Interface analysis server computer 130 additionally stores confounding variable identification instructions 134, interface feature matrix 136, machine learning model 138, and treatment effect identification instructions 139. Computer executable instructions described herein may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. In another embodiment, the programmed instructions also may represent one or more files or projects of source code that are digitally stored in a mass storage device such as non-volatile RAM or disk storage, in the systems of FIG. 1 or a separate repository system, which when compiled or interpreted cause generating executable instructions which when executed cause the computer to perform the functions or operations that are described herein with reference to those instructions. In other words, the drawing figure may represent the manner in which programmers or software developers organize and arrange source code for later compilation into an executable, or interpretation into bytecode or the equivalent, for execution by the interface analysis server computer 130 and/or the interface provider server computer 120.

Confounding variable identification instructions 134 comprise computer readable instructions which, when executed by the interface analysis server computer 130, cause the interface analysis server computer 130 to compute confounding variables from the interface data 132. The interface data 132 is used to generate an interface feature matrix 136. In embodiments, the confounding variables are additionally used to generate the interface feature matrix 136. In other embodiments, a separate covariance matrix is generated using the confounding variables. The interface feature matrix 136 and/or the covariance matrix are used to train a machine learning model 138. Machine learning model 138 may be any classification or matching algorithm, such as a generalized linear regression model or any other machine learning system which receives a plurality of input values and produces a probability or likelihood of a particular output.

Treatment effect identification instructions 139 comprise computer readable instructions which, when executed by the interface analysis server computer 130, cause the interface analysis server computer 130 to compute treatment effects for one or more treatment actions using the machine learning model. Methods for identifying the effects of individual treatment actions using a machine learning model configured to compute a likelihood of performance of a particular action based on previously performed actions are described herein. Identified treatment effects 140 may then be sent to the interface provider server computer 120 and/or used to update the graphical user interface.

3. Functional Overview

Figure 2:
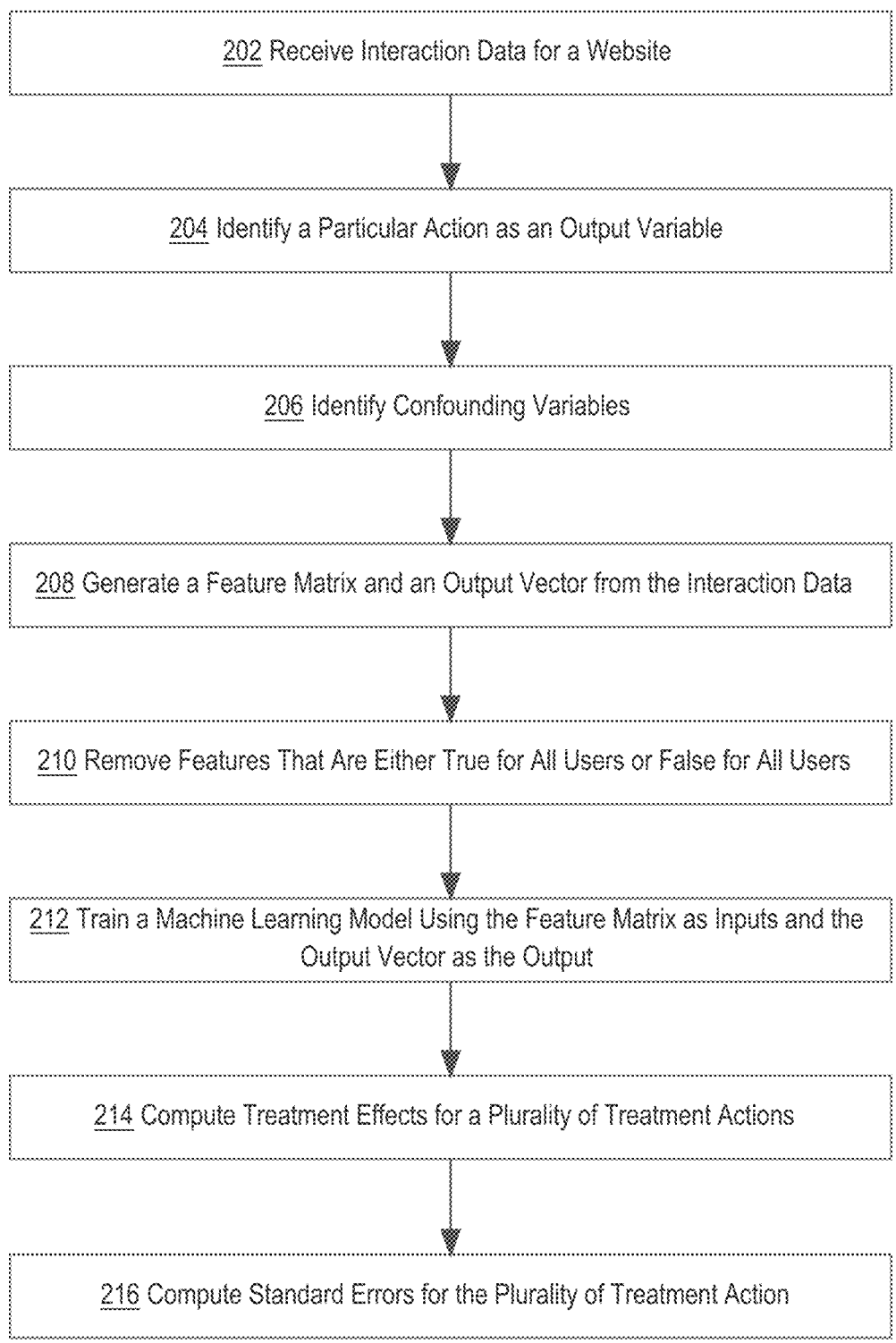
FIG. 2 is a flowchart depicting an example method for determining treatment effects of actions on a website.

FIG. 2 is a flowchart depicting an example method for determining treatment effects of actions on a website. FIG. 2, and all other flow diagrams herein, may serve as a plan or algorithm for programming one or more sets of computer-executable instructions which when compiled, loaded and executed cause performing the functions that are shown in the drawing figure. That is, FIG. 2 is intended to illustrate in functional terms the executable instructions that could be used for one implementation or embodiment of the appended claims, at the same level of detail that is customarily used by persons having an ordinary level of skill in the art to communicate among themselves about how to engineer or architect computer program(s) that accomplish the specified functions.

At step 202, interaction data is received for a website. For example, the interface provider server computer 120 may transmit interaction data to the interface analysis server computer 130. The interaction data may comprise a plurality of unique user identifiers and data identifying, for each of the plurality of unique user identifiers, each action performed by a user corresponding to the user identifier through a provided interface during a particular period of time, such as over the course of a week. In an embodiment, data for multiple periods of time is received, such as multiple weeks of data. The interaction data may also include attribute data identifying attributes of the users corresponding to the unique user identifiers, such as geographical location or other categorization.

At step 204, a particular action is identified as an output variable. For instance, the interface analysis server computer 130 may receive configuration data from the interface provider server computer 120 or other computing device identifying one or more actions for which to determine treatment effects. As a practical example, the interface analysis server computer 130 may provide a graphical user interface comprising options for uploading interaction data and options for specifying actions within the interaction data to be treated as the output variable. A user may input a particular action to be tracked, such as a purchase, upgrade, or other action the user wishes to monitor.

At step 206, confounding variables are identified in the interaction data. Confounding variables, as used herein, comprise variables which have a high impact on both the treatment variables and the output variable. The confounding variables may also be identified as variables that are orthogonal to each other, such that the increase in one variable does not cause a similar increase in another. This helps reduce the feature space for the input matrix, thereby reducing computation time and power required to train and use the machine learning model.

At step 208, a feature matrix and output vector are generated from the interaction data. For example, the interface analysis server computer 130 may store the interaction data as a plurality of rows of values, each of the rows corresponding to a different unique user identifier and each of the columns corresponding to a different action of the tracked actions. The values in the matrix may be binary values, such as values indicating whether the particular user of that row performed the action of that column, or integers, such as a number of times that the particular user of that row performed the action of that column. The output vector may comprise a vector where each value corresponds to a row of the feature matrix and indicates, for that row, whether the user corresponding to the user identifier of that row performed the particular action. Thus, each value in the output vector may be a binary value indicating whether the particular action was performed.

At step 210, features are removed from the feature matrix that are the same value for all users. For example, the interface analysis server computer 130 may remove columns for which every row comprises a 1 or for which every row comprises a 0. Thus, the feature matrix is reduced by removing any actions from the feature matrix that either all users perform or that no users perform.

At step 212, a machine learning model is trained using the feature matrix as inputs and the output vector as the output. For example, the interface analysis server computer 130 may train a linear regression model using the feature matrix as the inputs and the output vector as the outputs. Thus, the machine learning model may be trained to receive an input comprising a plurality of values corresponding to actions performed by a particular user and output a value indicating a likelihood that the user performed or will perform the output action. The trained machine learning model may be stored in memory of the interface analysis server computer 130.

At step 214, treatment effects are computed for a plurality of treatment actions. For example, the interface analysis server computer 130 may select a particular treatment action corresponding to a column of the feature matrix and compute a treatment effect value for the treatment action using the methods described herein. The treatment effect, as used herein, refers to a relative impact of performance of the treatment action on the eventual performance of the output action. Methods for computing the treatment effect value are described further herein. In an embodiment, the interface analysis server computer 130 computes treatment effect values for a plurality of treatment actions. Given that the treatment effect values are computed using the same machine learning model, the interface analysis server computer 130 may compute the treatment effect values in parallel, such as on different server computers.

At step 216, standard errors are computed for the plurality of treatment actions. The standard errors may be computed to provide more information on treatment effects for treatment actions that are performed extremely rarely which may give the model a bias towards said treatment actions if they are always coupled with performance of the output action. Systems and methods for computing treatment effects and standard errors are described further herein.

In an embodiment, the interface analysis server computer 130 sends treatment effects 140 to interface provider server computer 120. For example, the interface analysis server computer may generate a chart, graph, or other visual interface element which identifies actions and corresponding treatment effects. The interface analysis server computer may also rank the actions by treatment effect and/or identify actions with the highest treatment effects. Example interfaces are described further herein.

In an embodiment, the interface analysis server computer 130 is programmed or configured to update or otherwise alter a provided interface based on treatment effects. For example, the interface analysis server computer may move items corresponding to actions with high treatment effects to prominent positions on a front page and/or remove items with low or negative treatment effects from prominent positions on the front page.

4. Estimating Treatment Effects 4.1. Treatment Extraction

Figure 3:
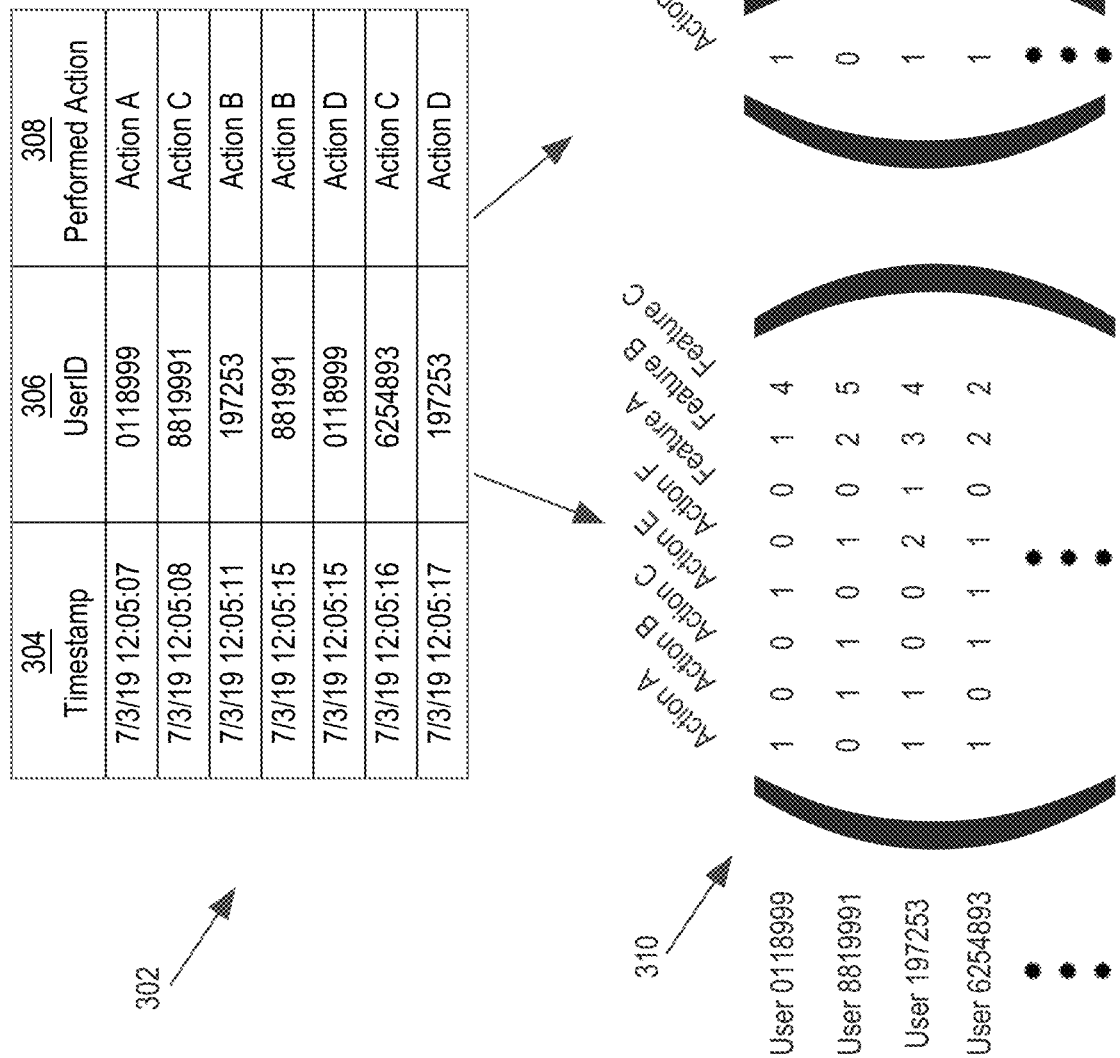
FIG. 3 depicts an example method of generating a feature matrix using interaction data.

FIG. 3 depicts an example method of generating a feature matrix using interaction data. While the input table of FIG. 3 depicts a particular form for the input data, the methods described herein may utilize any form of input data as long as the input data uniquely identifies each user and identifies actions performed on an interface by the uniquely identified user. The input data may additionally include features for each uniquely identified user, either in the input table or separately as a set of user feature data. The interface analysis server computer 130 may provide an interface for uploading the interaction data to the interface analysis server computer 130.

Input table 302 comprises interaction data for a particular interface, such as an application or website, which identifies, for a particular period of time, one or more actions performed on the interface. Actions may include complex actions, such as completing registration steps, or simple actions, such as selection of hyperlinks, scrolling to a particular point on a page, or hovering a mouse over an image which triggers display of additional text or information. Any known methods for tracking interactions with an interface may be used by the interface provider server computer 120 to generate the initial input table.

Timestamp 304 comprises a time at which a particular action was performed. As shown in FIG. 3, an input table 302 may be structured chronologically, such that actions performed at earlier times are displayed first. User ID 306 comprises a string, value, or other unique identifier used by the interface provider server computer 120 to uniquely identifier each user. The user identifier may identify a user based on a used device, such as through an internet protocol (IP) address, and/or based on user credentials, such as a user login for a browser and/or application. Performed action 308 comprises an identifier of an action performed on the interface. In an embodiment, performed action 308 comprises any tracked actions on the interface. Thus, there may be overlap in performed actions. For example, a registration completion action may overlap with an action of selecting a "complete registration" button. Each row of input table 302 corresponds to a particular action, such that the top row identifies a timestamp at which User 0118999 performed Action A through the provided interface.

The interface analysis server computer 130 may receive configuration data from the interface provider server computer 120 that identifies one or more output variables. For example, the interface analysis server computer 130 may display an interface with options for selecting actions from the transaction data for which treatment effects are to be computed. Actions may include completing registration, performing a conversion, completing a purchase, requesting an upgrade, or utilizing other particular features of the interface. If multiple output actions are selected, the interface analysis server computer 130 may complete the method for each selected output action.

In some embodiments, the configuration data additionally identifies one or more treatment variables to monitor. For example, a user may wish to only compute treatment effects for specific actions, as the interaction data may include a large number of actions, many of which may be of little importance in configuring an interface. Thus, to reduce a number of computations, the interface analysis server computer 130 may provide options for selecting particular treatments for which to compute treatment effects. In other embodiments, the interface analysis server computer 130 computes treatment effects for each action.

The input table 302 is used to create feature matrix 310. Each row of feature matrix 310 corresponds to a different unique user identifier. The interface analysis server computer 130 may search the UserID 306 column for each different user identifier and generate a new row in the feature matrix for each user identifier. Each column of the feature matrix 310 corresponds to a different action that can be performed through the interface and/or each action that was performed during the particular period of time as identified in the interaction data. Thus, the interface analysis server computer 130 may initialize a matrix with a number of rows corresponding to a number of users and a number of columns corresponding to a number of actions and/or additional features.

Each matrix cell value may comprise a count of a number of times a user performed an action or a binary indication as to whether the user performed the action. For example, the interface analysis server computer 130 may perform a search of the interaction data for each user identifier. For each row corresponding a user identifier, the interface analysis server computer 130 may set a matrix cell value to "1" if the interaction data indicates that an action corresponding to the matrix cell value's column was performed by a user corresponding to the matrix cell value's row. As another example, instead of setting the matrix cell value to "1" for performed actions, the interface analysis server computer 130 may set a value for the column to a count of a number of times the user performed the action within the particular period of time.

In an embodiment, the feature matrix additionally includes user features. The user features may include categorizations of any tracked features, such as location, device type, age range, or other methods of categorizing users. Each category for a feature may be assigned a different numerical value, such as depicted in the feature matrix 310 with feature B and feature C. Additionally or alternatively, each category for a feature may comprise a different column. Thus, for the location feature, a first column may correspond to the United Kingdom while a second column corresponds to Latvia. If a user's location is Latvia, a matrix cell value in the United Kingdom column for the user's row may be set to "0" while the matrix cell value in the Latvia column may be set to "1".

4.2. Matrix Simplification

While the feature matrix 310 is depicted as including each action and feature, interfaces with a large number of actions or features may cause the training of a matrix based on each action to be computationally and temporally expensive. Thus, the interface analysis server computer 130 may perform actions to simply the feature matrix 310 to reduce training and computation time while preserving accuracy.

In an embodiment, the interface analysis server computer 130 reduces the size of the training matrix by removing columns from the matrix that do not provide additional value. For example, the interface analysis server computer 130 may identify each column the matrix cell values for each row are the same. Thus, if an action in the interface is not performed by any user, all the values in that action's column may be set to "0". The interface analysis server computer 130 may remove the column from the matrix. Additionally, for any actions that every user has performed in a binary column, the interface analysis server computer 130 may remove the column from the matrix. As another example, the interface analysis server computer 130 may remove duplicate columns. Thus, if two actions are the same in that they are performed by only the same users, the interface analysis server computer 130 may remove one of the columns. When a treatment effect is computed for a remaining duplicate column, it may be applied to the removed actions.

4.3. Confounding Variable Generation

In an embodiment, the interface analysis server computer 130 computes one or more confounding variables for training the machine learning model. Confounding variables, as used herein, refer to variables with high impact on both the treatment variables and the output variable. Confounding variables may be computed to comprise a linear combination of a plurality of user actions For example, a confounding variable may be computed to take the form of:

$$x_i = t_1 + at_2$$

where $x_i$ is the confounding variable, $t_1$ and $t_2$ are user actions that occurred prior to the treatment action, and a is a constant value. While the example confounding variable only includes two features, other confounding variables may include any number of features depending on determinations by the interface analysis server computer 130.

In an embodiment, the interface analysis server computer 130 computes the confounding variables using Principal Component Analysis (PCA) on past user actions and/or features. The interface analysis server computer 130 may use a previous week's data to compute the confounding variables for the current week, thereby ensuring the confounding variables are not influenced by other treatment actions. Applying PCA to a plurality of actions and/or features that occurred prior to the treatment variable, the interface analysis server computer 130 may generate a first linear combination of variables that accounts for as much of the variability in the data as possible, followed by computing a plurality of other variables, each or which are orthogonal to the proceeding variables while accounting for as much of the remaining variability in the data as possible. In this manner, a feature space may be minimized from hundreds of features to a small number of linear combinations of features.

The interface analysis server computer 130 may use the confounding variables to generate a covariate matrix. The covariate matrix may comprise a plurality of rows corresponding to each row of the feature matrix, i.e. corresponding to the same users, and a plurality of columns corresponding to each covariate. Thus, each matrix cell value may comprise a confounding variable value for the matrix cell's row's user and for the matrix cell's column's confounding variable. The interface analysis server computer 130 may generate the covariate matrix by, for each matrix cell, computing a value for the confounding variable using input of the user. Thus, if a particular confounding variable takes the form of $x_i=t_1+5t_2$ and for a particular user $t_1=0.5$ and $t_2=0.2$, then the confounding variable value for the particular confounding variable and particular user may be computed as 0.5+5 (0.2)=1.5.

In an embodiment, the interface analysis server computer 130 computes confounding variables for user features. User features may include tracked features relating to individual users, such as device, physical location, prior website use, purchase history, viewed advertisements, or any other features that vary between users. As the user attribute data can include thousands of variables, generating confounding variables from the user attribute data can significantly reduce the computation cost of training the machine learning system and computing outputs. For example, thousands of user attributes can be reduced to five or ten confounding variables. Thus, in this method, the interface analysis server computer 130 may generate two matrices, one matrix comprising a feature matrix of actions performed through the interface and a second matrix comprising a covariate matrix of values for the confounding variables for each user.

In an embodiment, prior to performing the PCA computation, the interface analysis server computer 130 scales all features to have unit standard deviation. For example, for each column, the interface analysis server computer 130 may identify the standard deviation of the column and divide each value of the column by the standard deviation. Scaling the data to have unit standard deviation allows the interface analysis server computer 130 perform the PCA computation more accurately.

In an embodiment, the interface analysis server computer 130 performs polynomial expansion on the confounding variables to include higher degree polynomials. As an example, given confounding variables $x_1$ and $x_2$, the interface analysis server computer 130 could also include another confounding variable that takes on the value $x_1 * x_2$. By performing polynomial expansion, the interface analysis server computer 130 takes into account higher order combinations of the individual features.

4.4. Machine Learning Model

In an embodiment, the interface analysis server computer 130 trains a linear regression model using the feature matrix as inputs and the output vector as the output. The linear regression model may additionally be trained using the user features and/or confounding variables as inputs. For example, the interface analysis server computer 130 may append columns to the feature matrix for the confounding variables and/or user features and use the appended feature matrix to train the linear regression model.

In an embodiment, a linear regression model is fit to a linear combination of the feature matrix and the covariate matrix generated using the confounding variables. As an example, the hypothesis for the model may take the form of:

$$y = \beta_0 + \beta_1 T + \beta_2 X + \beta_3 TX$$

where $\beta_0$, $\beta_1$, $\beta_2$, and $\beta_3$ are the parameters of the model, T is the feature matrix comprising treatment actions, and X is the covariate matrix comprising the confounding variables and/or user features. The hypothesis above provides an improved modeling approach through the interaction term $\beta_3 TX$. The interaction term allows the model to calculate non-constant treatment effects over different values of the confounding variables. This results in a more accurate calculation of the treatment effect due to the model accounting for how the treatment effect varies for each user based on the value of their confounding variables.

The use of the covariate matrix comprising the confounding variables improves the server computer's ability to train a model that includes the covariate matrix. For example, if the interaction data includes one hundred actions and one thousand user features, then a model of the form of $y=\beta_0 + \beta_1 T + \beta_2 X$ would include 1100 features while the term $\beta_3$ TX includes 100×1,000 or 100,000 features. By generating a smaller set of confounding variables through dimensionality reduction techniques such as PCA, the system greatly decreases the computational cost and time required to train the machine learning model and to use the machine learning to compute outputs.

In an embodiment, the regression model is additionally trained using a regularization term. Regularization terms generally punish the model for including higher weights and thus, regularization terms tend to be on the order of magnitude or close to the model inputs. A small regularization term, such as on the order of magnitude of $10^{-8}$, may be used in the machine learning model to ensure a non-singular covariance matrix without affecting the accuracy of estimating treatment effects. By using a small regularization term, the only affects are that the training of the machine learning model is able to converge when two features or confounding variables have a same effect or are otherwise duplicated.

4.5. Computing Treatment Effects

In an embodiment, the interface analysis server computer 130 uses the machine learning model to compute treatment effects for one or more treatment variables. The machine learning model is generally trained to determine, based on a set of input actions, a likelihood of performing the output action. As machine learning models often work as black boxes, it can be difficult to determine, from the model alone, an effect of a particular treatment action on the model. This difficulty is exacerbated when the covariates are included in the model. Thus, the interface analysis server computer 130 may use the training data of the model and/or other interaction data to compute the treatment effects.

Initially, the interface analysis server computer 130 may identify treatment variables for which to compute treatment effects. For example, the interface analysis server computer 130 may receive configuration data from the interface provider server computer 120 identifying actions for which to compute treatment effects. Additionally or alternatively, the interface analysis server computer 130 may compute treatment effects for each action or each action that is not a duplicate and/or that does not comprise the same value for all users.

To compute the treatment effect for a particular treatment action, the interface analysis server computer 130 may initially access a feature matrix generated from interaction data for a particular period of time, such as the feature matrix used to train the machine learning model or a feature matrix generated from interaction data covering a different period of time and/or different users. The interface analysis server computer 130 may then identify a column in the feature matrix corresponding to the particular treatment action.

For each value in the column, the interface analysis server computer 130 may adjust the value to indicate that the action was performed. For example, for a binary feature the interface analysis server computer 130 may set each value in the column to be equal to 1, thereby indicating that the action was performed. For each row of the feature matrix, the interface analysis server computer 130 may then compute an output using the machine learning model. The interface analysis server computer 130 may then compute an average of all outputs as an average positive output.

For each value in the column, the interface analysis server computer 130 may adjust the value to indicate that the action was not performed. For example, for a binary feature the interface analysis server computer 130 may set each value in the column to be equal to 0, thereby indicating that the action was not performed. For each row of the feature matrix, the interface analysis server computer 130 may then compute an output using the machine learning model. The interface analysis server computer 130 may then compute an average of all outputs as an average negative output. This step may be performed before, after, or concurrently with the previous steps. For example, the interface analysis server computer 130 may compute the average positive output in parallel with the average negative output.

The interface analysis server computer 130 may compute the treatment effect as the difference between the average positive output for the variable and the average negative output for the variable. Thus, the treatment effect describes a computed uplift in likelihood of performance of the output action based on performance of a particular treatment action. The interface analysis server computer 130 may compute the treatment effect using the same method for each treatment action. As the interface analysis server computer 130 is computing the treatment effects without altering the machine learning model itself, the interface analysis server computer 130 can compute treatment effects for multiple treatment actions in parallel. For example, the interface analysis server computer 130 may comprise a plurality of physical and/or cloud server computers, each of which may use the machine learning model to compute a different treatment effect.

The interface analysis server computer 130 may also compute treatment effects for combinations of actions. For example, the interface analysis server computer 130 may select two treatment actions and compute the difference between an average positive output and average negative output for the two treatment actions. The interface analysis server computer 130 may select combinations of features based on prior identified treatment effects, such as creating combinations of two features within the top twenty treatment effects. Additionally or alternatively, the interface analysis server computer 130 may compute combinations based on configuration data and/or through generating combinations of features based on location in the interface. For example, the interface analysis server computer 130 may combine actions with actions that can be performed afterwards.

In an embodiment, in addition to computing the treatment effect, the interface analysis server computer 130 may compute a standard error for each treatment effect. A standard error and/or t-statistic variable may be computed using the covariance matrix of the machine learning model. For example, the interface analysis server computer 130 may compute the standard error as:

$$SE = \sqrt{M * C(\beta) * M^T}$$

wherein $C(\beta)$ is the covariance matrix comprising the covariance of the parameter of the trained machine learning model, and M is an average value matrix for the particular treatment effect comprising average values for each term in the regression model when the treatment action is set to true for all users and all other treatment actions are set to false for all users.

Using the methods described herein, the interface analysis server computer 130 can analyze thousands of treatment actions simultaneously and identify specific treatment actions which have a high causal impact on performance of a specific action in seconds. By using the methods, the interface analysis server computer 130 can compare each treatment action without making assumptions as to the highest affecters. The treatment effect data produced can be sent to the interface provider server computer 120 for use in updating the interface and/or used to automatically update the interface. For example, features with the highest treatment effect may be moved to a main page of the interface, moved to a more prominent position on the interface, and/or increased in size. Additionally, combinations of actions with high treatment effects may be used to create responsive actions. For example, if two actions have a high treatment effect when combined, then the interface analysis server computer 130 may update the interface to cause display of an option to perform one of the two actions after the other is performed.

4.6. Parallelization

In an embodiment, the systems and methods utilize parallelization of computations based on the unique design of the machine learning system to decrease memory, power, and time requirements when using a large amount of data. Interaction data for a particular website or application can include hundreds to thousands of treatment actions. To efficiently build a feature matrix for a single interface, train the machine learning system, and compute treatment effects for each treatment action on a single machine can have a high cost in memory, power, and time. This cost is compounded if the system is performing computations for a plurality of different interfaces. Thus, the system may break down different portions of the computations to be performed by different processes and/or servers in parallel.

Figure 6:
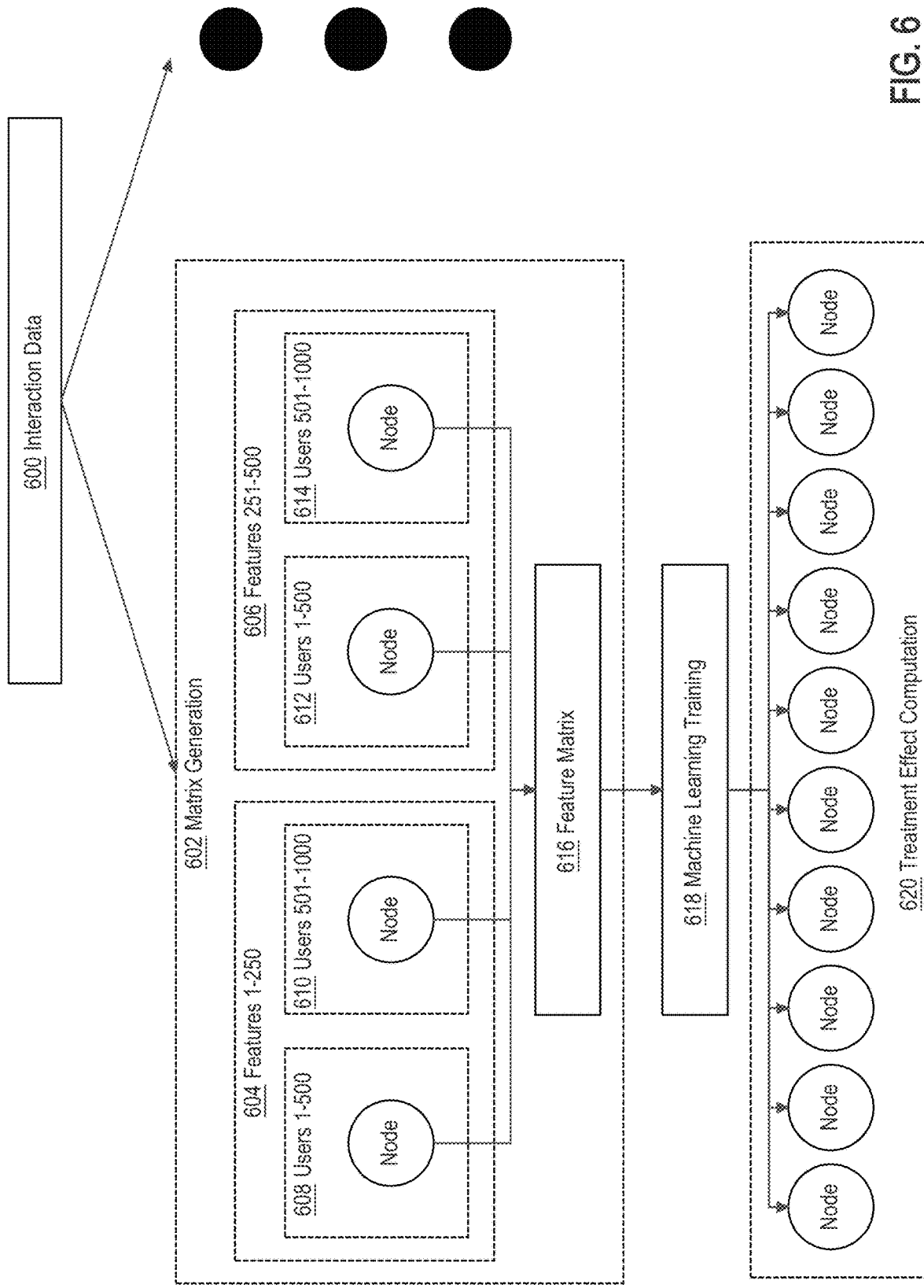
FIG. 6 depicts an example embodiment of using parallelization to increase the efficiency with which one or more server computers compute treatment effects.

FIG. 6 depicts an example embodiment of using parallelization to increase the efficiency with which one or more server computers compute treatment effects. Interaction data 600 comprises interaction data for a plurality of different interfaces and/or periods of time. Thus, in addition to performing all of the steps for a particular interface in parallel, the system may compute treatment effects for a plurality of different interfaces in parallel by assigning a plurality of nodes to perform computations for each interface. Thus, while matrix generation 602 is depicted for a single interface, the interface generation, training, and modeling depicted in FIG. 6 may be mirrored with other servers for different interfaces.

Matrix generation 602 may be parallelized through breaking up the features and users and assigning combinations to different nodes. Features 604 are assigned to a first set of nodes which build the first 250 features into a feature matrix while features 606 are assigned to a second set of nodes which build the second 250 features into a feature matrix. For each set of features, the users are also divided. Thus, users 608 and 612 are assigned to one node of features 604 and 606 respectively and users 610 and 614 are assigned to a second node of features 604 and 606 respectively. In the example of FIG. 6, instead of a single server or process building a 1000×500 matrix, four nodes each build a 500× 250 matrix and then combine the matrices into feature matrix 616.

This approach of dividing the interaction data into parallel feature generation is both computationally efficient and automatically scalable. For example, a master node may store feature and/or user threshold values. The master node may be configured to use the feature threshold value as a maximum number of features that may be assigned to a set of nodes. Thus, if the feature threshold value is set to 100 and the interaction data comprises 256 features, the master node may spin up three sets of server computers. The master node may be configured to use the user threshold value as a maximum number of users that may be assigned to a node in a set of nodes. Thus, the master node may automatically scale the parallelization of matrix generation based on the number of features and users in the interaction data.

While FIG. 6 depicts the generation of the feature matrix in parallel, the same methods may be applied to the generation of the covariate matrix. For example, the system may use PCA to identify the covariate functions, but use a plurality of nodes to compute the covariates for each user to generate the covariate matrix. As with the feature matrix, the parallelization of the covariate matrix may be broken up by covariate and/or by number of users and then combined into the covariate matrix.

Feature matrix 616 may be used to perform machine learning training 618 using the machine learning model. Machine learning training 618 may also be performed using parallelization (not shown), such as through standard machine learning libraries. The trained machine learning model may then be used in parallel by a plurality of nodes to perform treatment effect computation 620. For example, each node may compute a treatment effect for a different treatment action and/or a different subset of treatment actions.

While parallelization is depicted in FIG. 6 using two feature sets, two user sets, and ten treatment effect computations, the systems and methods described herein are scalable to be performed using hundreds or thousands of nodes. Massive parallelization allows the system to efficiently generate large matrices and efficiently perform computations of treatment effects for a large number of treatments.

By parallelizing different steps in the process, the system increases the viability of a process that can be treatment action agnostic in computing treatment effects. Allowing the system to be agnostic to the number of treatments or users allows the system to reduce or eliminate bias in measuring treatment effects for interfaces which are accessed by a large number of users and which include a large number of actions that can be performed by each user.

4.7. Example Treatment Effect Interface

Figure 4:
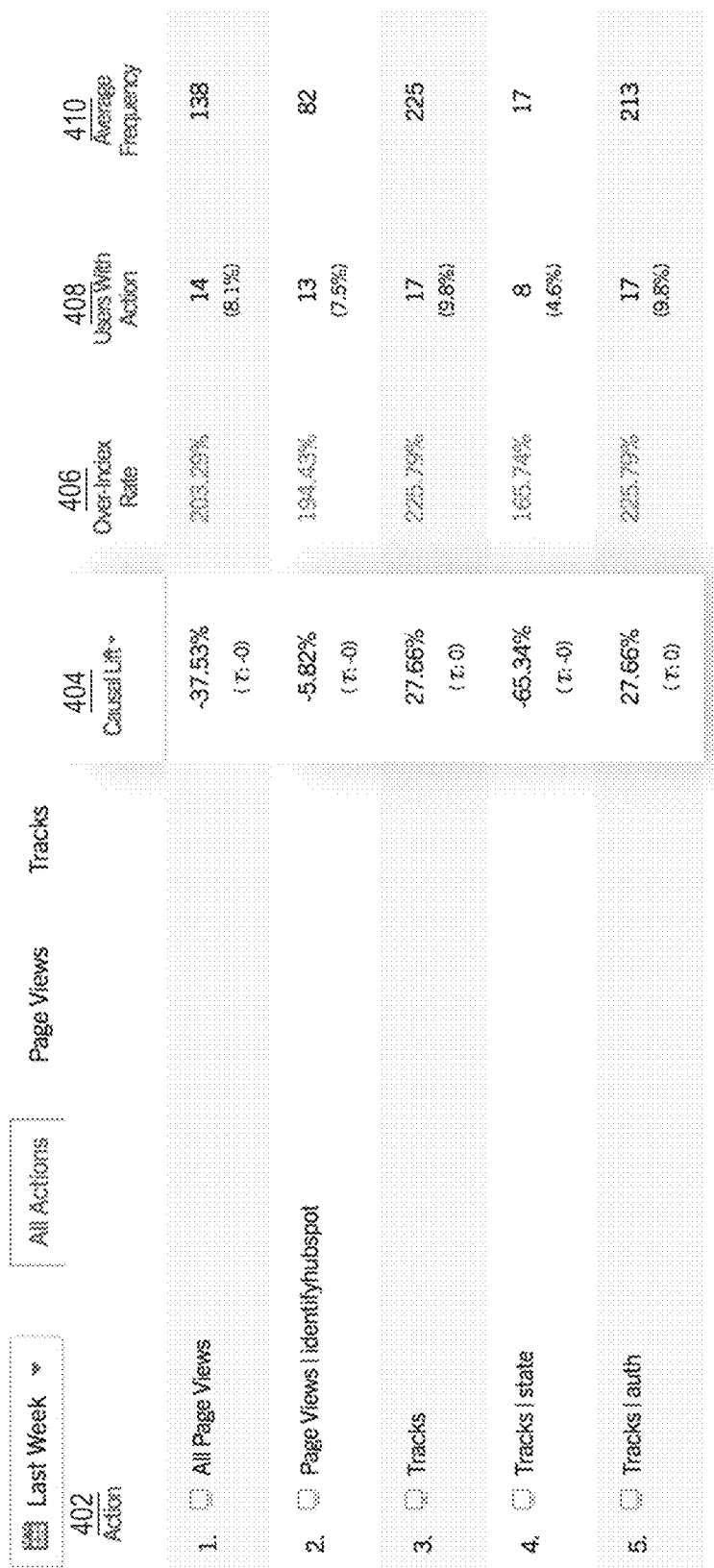
FIG. 4 depicts an example graphical user interface for displaying treatment effects.

In an embodiment, the interface analysis server computer 130 provides a display of treatment effects to a computing device associated with the interface provider server computer 120. FIG. 4 depicts an example graphical user interface for displaying treatment effects. Interface 400 comprises actions 402, causal lift 404, over-index rate 406, users with action 408, and average frequency 410. Actions 402 identify each treatment action for which a treatment effect was computed.

Causal lift 404 comprises a computed treatment effect for the corresponding action. The causal lift 404 may comprise an augmented treatment effect based on the standard errors. For example, the interface analysis server computer 130 may create a 95% confidence interval by subtracting 1.6 times the standard error from the treatment effect. The causal lift 404 in FIG. 4 additionally depicts the standard errors. Overindex rate 406 comprises a percentage of users who performed the treatment action within a defined cohort or segment, divided by a percentage of users that performed the target action across the entire population. Users with action 408 identifies a number and a percentage of users who have performed the action over a particular period of time, such as a week. Average frequency 410 comprises the average frequency with which users perform the action.

5. Benefits of Certain Embodiments

The systems and methods described herein use machine learning models to solve an intractable problem, thereby reducing computational power requirements. Specifically, a machine learning model is trained to simulate and A/B test environment with thousands of variables, thereby providing computations that otherwise would have required large amounts of computational resources. Additionally, by computing treatment effects in parallel, a server computer can reduce computation time in generating treatment effects. The systems and methods also improve computing systems by providing a small regularization term to provide conversion of the machine learning model, by reducing the size of the feature matrix through intelligent removal of treatment actions, and/or by generating a set of confounding variables, thereby reducing the size of a matrix corresponding to user attributes and reducing the time and computational power required to train the machine learning model.

The systems and methods described herein may also be used to automatically modify a graphical user interface based on user input. As described herein, options to perform actions with high treatment effects may be moved to prominent positions on the interface, increased in size, and/or paired with other features that, in combination, also correspond to high treatment effects.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
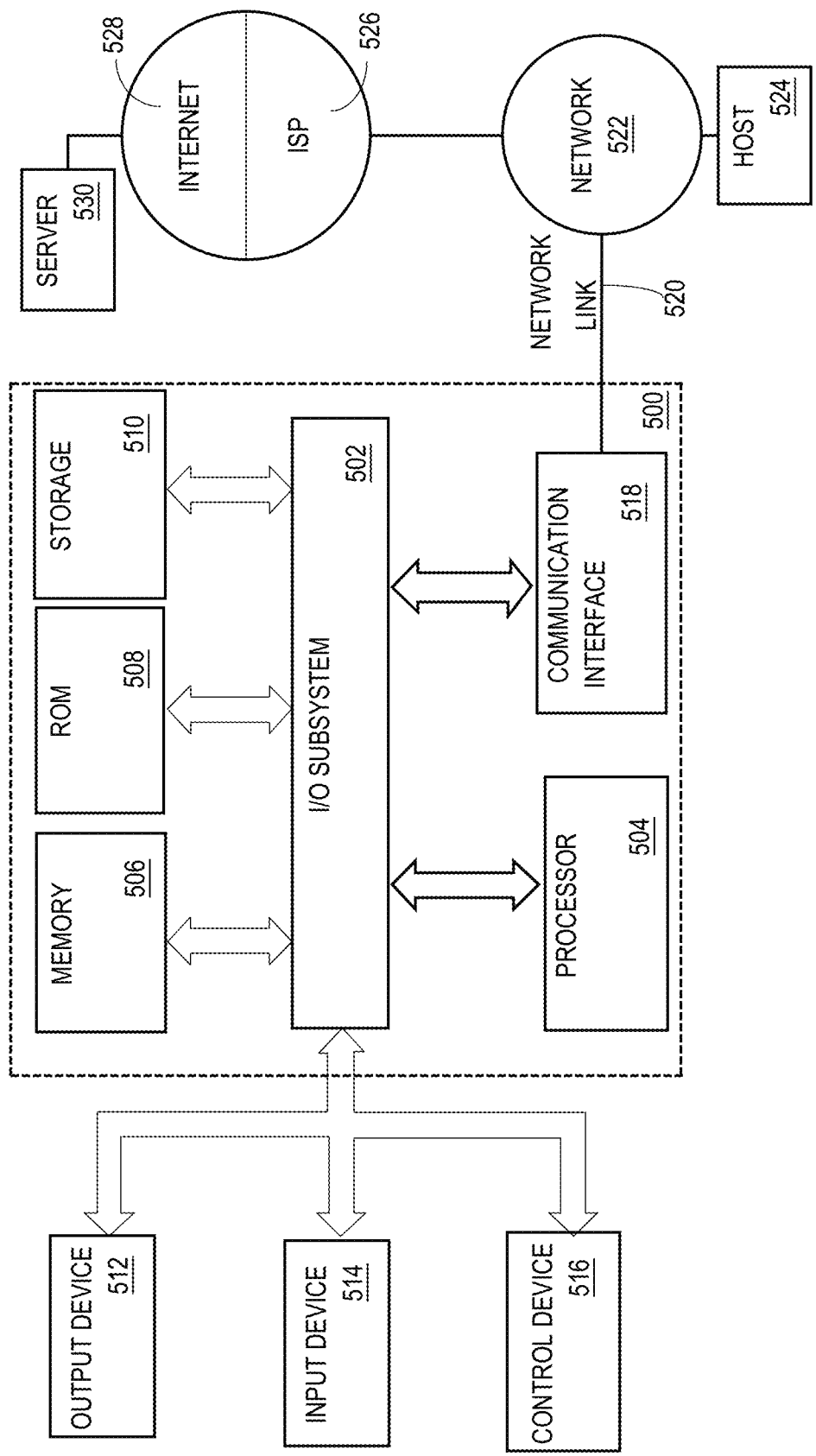
FIG. 5 is a block diagram that illustrates a computer system upon which an embodiment may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

The invention claimed is:

1. A computing system comprising:
one or more processors; and
a non-transitory memory storing instructions that, when executed by the one or more processors, cause performance of:
receiving, for a user interface, interaction data for a period of time that identifies a plurality of users and a plurality of actions performed by the plurality of users through the user interface during the period of time;
identifying a target action, from the plurality of actions, as an output variable;
generating a feature matrix comprising matrix cell values providing an indication of user performance or non-performance of the plurality of actions;
training a machine learning model using the feature matrix as input and values providing an indication of user performance or non-performance of the target action as output;
identifying a treatment action from the plurality of actions;
computing, using the machine learning model, a treatment effect for the identified treatment action, the treatment effect providing an indication of an impact that performance of the treatment action has on eventual performance of the target action; and
facilitating an update to the user interface based at least in part on the computed treatment effect.

2. The computing system of claim 1, wherein the feature matrix comprises a plurality of rows corresponding to the plurality of users and a plurality of columns corresponding to the plurality of actions, and wherein the matrix cell values comprise a count of a number of times a user performed an action from the plurality of actions or a binary indication of whether the user performed the action.

3. The computing system of claim 1, wherein the instructions, when executed by the one or more processors, further cause performance of:
receiving user data describing one or more attributes of the plurality of users,
wherein generating the feature matrix comprises including the one or more attributes of the plurality of users in the feature matrix.

4. The computing system of claim 1, wherein generating the feature matrix comprises removing one or more actions that are either true across all users or false across all users.

5. The computing system of claim 1, wherein generating the feature matrix comprises removing one or more features, from the feature matrix, that have a same value for all users of the plurality of users.

6. The computing system of claim 1, wherein generating the feature matrix comprises generating a plurality of feature matrices in parallel, and wherein each feature matrix from the plurality of feature matrices corresponds to a respective combination of users and features.

7. The computing system of claim 1, wherein the instructions, when executed by the one or more processors, further cause performance of:
receiving user data describing a plurality of attributes of the plurality of users;
using principal component analysis computing one or more confounding variables comprising a linear combination of a subset of the plurality of attributes using previous interaction data from a previous period of time prior to the period of time;
appending columns to the feature matrix for the computed one or more confounding variables; and
training the machine learning model using the appended feature matrix.

8. The computing system of claim 1, wherein the instructions, when executed by the one or more processors, further cause performance of:
receiving user data describing a plurality of attributes of the plurality of users;
using principal component analysis computing one or more confounding variables comprising a linear combination of a subset of the plurality of attributes using previous interaction data from a previous period of time prior to the period of time;
generating a covariate matrix for the one or more confounding variables, the covariate matrix comprising a plurality of rows corresponding to the plurality of users and a plurality of columns corresponding to the one or more confounding variables; and
training the machine learning model using the feature matrix and the covariate matrix.

9. The computing system of claim 8, wherein the instructions, when executed by the one or more processors, further cause performance of performing polynomial expansion on the one or more confounding variables to include higher degree polynomials.

10. The computing system of claim 1, wherein the machine learning model is a linear regression model.

11. The computing system of claim 1, wherein training the machine learning model comprises using a regularization term.

12. The computing system of claim 1, wherein computing the treatment effect for the identified treatment action comprises:
generating a simulated treatment feature matrix by setting all values for the treatment action to true;
computing an average output for the simulated treatment feature matrix using the trained machine learning model;
generating a simulated control feature matrix by setting all values for the treatment action to false;
computing an average output for the simulated control feature matrix using the trained machine learning model; and
computing the treatment effect as a difference between the average output for the simulated treatment feature matrix and the average output for the simulated control feature matrix.

13. The computing system of claim 1, wherein computing the treatment effect for the identified treatment action comprises computing treatment effects for combinations of more than two treatment actions.

14. The computing system of claim 1, wherein computing the treatment effect for the identified treatment action comprises computing a standard error using a covariance matrix of weights in the machine learning model.

15. The computing system of claim 1, wherein the instructions, when executed by the one or more processors, further cause performance of computing a plurality of treatment effects for a plurality of treatment actions in parallel.

16. A computer-implemented method comprising:
receiving, for a user interface, interaction data for a period of time that identifies a plurality of users and a plurality of actions performed by the plurality of users through the interface during the period of time;
identifying a target action, from the plurality of actions, as an output variable;
generating a feature matrix comprising matrix cell values providing an indication of user performance or non-performance of the plurality of actions;
training a machine learning model using the feature matrix as input and values providing an indication of user performance or non-performance of the target action as output;
identifying a treatment action from the plurality of actions; and
computing, using the machine learning model, a treatment effect for the identified treatment action, the treatment effect providing an indication of an impact that performance of the treatment action has on eventual performance of the target action; and
facilitating an update to the user interface based, at least in part, on the computed treatment effect.

17. The computer-implemented method of claim 16, further comprising:
receiving user data describing one or more attributes of the plurality of users, wherein generating the feature matrix comprises including the one or more attributes of the plurality of users in the feature matrix.

18. The computer-implemented method of claim 16, further comprising:
receiving user data describing a plurality of attributes of the plurality of users;
using principal component analysis computing one or more confounding variables comprising a linear combination of a subset of the plurality of attributes using previous interaction data from a previous period of time prior to the period of time;
appending columns to the feature matrix for the computed one or more confounding variables; and
training the machine learning model using the appended feature matrix.

19. The computer-implemented method of claim 16, further comprising:
receiving user data describing a plurality of attributes of the plurality of users;
using principal component analysis computing one or more confounding variables comprising a linear combination of a subset of the plurality of attributes using previous interaction data from a previous period of time prior to the period of time;

generating a covariate matrix for the one or more confounding variables, the covariance matrix comprising a plurality of rows corresponding to the plurality of users and a plurality of columns corresponding to the one or more confounding variables; and training the machine learning model using the feature matrix and the covariate matrix.

20. The computer-implemented method of claim 16, wherein computing the treatment effect for each treatment action comprises:

generating a simulated treatment feature matrix by setting all values for the treatment action to true;

computing an average output for the simulated treatment feature matrix using the trained machine learning model;

generating a simulated control feature matrix by setting all values for the treatment action to false;

computing an average output for the simulated control feature matrix using the trained machine learning mode; and computing the treatment effect as a difference between the average output for the simulated treatment feature matrix and the average output for the simulated control feature matrix.

* * * * *